(12) United States Patent
Chang

(10) Patent No.: US 8,696,111 B2
(45) Date of Patent: Apr. 15, 2014

(54) SPECTACLE FRAMES USING CELLULOID PLATE AND MANUFACTURING METHOD THEREOF

(76) Inventor: Jung Tae Chang, Seoul (KR)

(*) Notice: Subject to any disclaimer, the term of this patent is extended or adjusted under 35 U.S.C. 154(b) by 44 days.

(21) Appl. No.: 13/582,604

(22) PCT Filed: Oct. 12, 2010

(86) PCT No.: PCT/KR2010/006958
§ 371 (c)(1),
(2), (4) Date: Sep. 4, 2012

(87) PCT Pub. No.: WO2011/108791
PCT Pub. Date: Sep. 9, 2011

(65) Prior Publication Data
US 2012/0327361 A1 Dec. 27, 2012

(51) Int. Cl.
*G02C 5/14* (2006.01)
*G02C 5/00* (2006.01)
*G02C 1/04* (2006.01)

(52) U.S. Cl.
CPC .. *G02C 5/14* (2013.01); *G02C 5/00* (2013.01); *G02C 1/04* (2013.01)
USPC ............. 351/121; 351/41; 351/111; 351/123; 351/141

(58) Field of Classification Search
CPC ............ G02C 5/14; G02C 5/00; G02C 5/143; G02C 5/2209; G02C 5/22; G02C 1/04
USPC ............................ 351/41, 103–123, 140–153
See application file for complete search history.

(56) References Cited

U.S. PATENT DOCUMENTS 4,131,340 A * 12/1978 Preston .......................... 351/118
6,116,733 A * 9/2000 Krumme et al. .............. 351/114

FOREIGN PATENT DOCUMENTS

| KR | 20-1992-0012979 U | 7/1992 |
| KR | 10-2005-0087607 A | 8/2005 |
| KR | 10-2006-0116788 A | 11/2006 |
| KR | 10-2008-0100069 A | 11/2008 |
| KR | 20-2009-0012389 U | 12/2009 |

* cited by examiner

*Primary Examiner* — Zachary Wilkes
*Assistant Examiner* — Daniele Manikeu
(74) *Attorney, Agent, or Firm* — Edwards Wildman Palmer LLP

(57) ABSTRACT

Provided are spectacle frames and a manufacturing method thereof, in which a front of the spectacle frames is formed by processing a celluloid plate of plastic, and temples are mounted on the front of the spectacle frames, thereby manufacturing the spectacle frames using the celluloid plate. The present invention does not require injection molding and an injection mold, and by processing both a hinge part and the front of the spectacle frames, the spectacle frames that can be applied to various wearers' face sizes can be manufactured with only the front of the frames having a single size. Also, by merely changing a design, various designs of the spectacle frames can be realized with only the front of the frames having a single size.

6 Claims, 13 Drawing Sheets

(a)  (b)  (c)  (d)

SPECTACLE FRAMES USING CELLULOID PLATE AND MANUFACTURING METHOD THEREOF

CROSS-REFERENCES TO RELATED APPLICATIONS

This application is a U.S. national phase application, pursuant to 35 U.S.C. §371, of PCT/KR2010/006958, filed Oct. 12, 2010, designating the United States, which claims priority to Korean Application No. 10-2010-0019522, filed Mar.4, 2010 The entire contents of the aforementioned patent applications are incorporated herein by this reference.

TECHNICAL FIELD

The present invention relates to spectacle frames and a manufacturing method thereof, and more particularly, to spectacle frames using a celluloid plate and a manufacturing method thereof, in which a front of the spectacle frames is formed by processing a celluloid plate of plastic, and temples are mounted on the front of the spectacle frames, thereby manufacturing the spectacle frames using the celluloid plate.

BACKGROUND ART

Spectacles correct and protect eyesight, and moreover act as an accessory that changes a wearer's appearance. Most young spectacle wearers who are particularly sensitive to fashion purchase and alternately wear several pairs of spectacles having different designs. Spectacle frames are mainly formed of plastic or metal. In plastic frames, the front of the spectacle frames is formed through injection molding, and the spectacle frames are finished by mounting the temples on the front. In metal frames also, the front of the spectacle frames is formed through injection molding or forging, and the spectacle frames are finished by mounting the temples on the front.

In the conventional plastic spectacle frames, the front of the spectacle frames is mostly formed through injection molding, and the spectacle frames are finished by mounting the temples on the side hinge part of the front of the frames. In the conventional plastic frames, a hinge part is injection-molded such that the hinge part and the temples are disposed on the same plane, or the temples are disposed at the side of the front of the frames that is injection-molded, and then both the front end parts of the temples and the front are formed.

Therefore, the conventional plastic frames have a limitation in that it is difficult to manufacture the spectacle frames having various sizes according to wearers' face sizes. Also, since the spectacle frames are manufactured to have various sizes, various types of molds for injection molding are inevitably required.

Moreover, even in conventionally manufacturing the front of the spectacle frames through a cutting process, a hinge part may be formed, but a conventional hinge part is easily broken, and thus, manufacturing the spectacle frames through a cutting process is not attempted.

Moreover, in injection molding of plastic, various injection molds are required, and thus, the manufacturing cost increases.

DETAILED DESCRIPTION OF THE INVENTION

Technical Problem

The present invention is directed to provide spectacle frames and a manufacturing method thereof, which do not require injection molding and an injection mold.

The present invention is also directed to provide spectacle frames that can be applied to various wearers' face sizes by processing both a hinge part and the front of the frames, and a manufacturing method thereof.

The present invention is also directed to provide spectacle frames and a manufacturing method thereof, in which a mold for molding is unnecessary because a previously manufactured plastic plate is used, and thus manufacturing is simple, and the cost is saved.

The present invention is also directed to provide spectacle frames that include a sturdy connection part of a hinge part formed on the same plane as that of the front of the frames, and a manufacturing method thereof.

Technical Solution

According to an aspect of the present invention, there is provided a method of manufacturing spectacle frames using a celluloid plate, including: cutting the celluloid plate to process a front 10 of the spectacle frames in which a hinge part 200 is protrusion-formed at a side surface portion of the front 10, and forming a lens mounting groove 101 in an inner circumference surface of an eyeball part 100 of the front 10; forming two punch holes 201 that pass through a front surface and rear surface of the hinge part 200 to be inclined at a certain angle, for connecting temples 500 to the hinge part 200 that is protrusion-formed at a side surface of the processed front 10; forming a slot 204, into which each of the temples 500 is inserted, in a side surface portion of the hinge part 200 with the punch holes 201 formed therein; forming each temple 500 that includes a ㄱ-shaped connection part 501 that is configured with a metal plate corresponding to a width of the slot 204, and an ear hanging part 503 that is hinge-coupled to one end of the ㄱ-shaped connection part 501 to be foldable in an internal direction, a through hole 502 being formed in the other end of the ㄱ-shaped connection part 501; and inserting the one end of the ㄱ-shaped connection part 501 into the slot 204 formed in the hinge part 200, insertion-fixing a coupling means to the punch hole 201 and the through hole 502, and coupling each temple 500 to the front 10.

In the present invention, the punch hole 201 formed in the hinge part 200 of the front 10 may be formed to be inclined at a certain angle in a direction from the front surface to the rear surface of the hinge part 200. The punch hole 201 is formed to be inclined at a certain angle, and a large shear force and stress can be applied to the punch hole 201. That is, the punch hole 201 is not formed in a straight line but is formed to be inclined at a certain angle, and thus, a cross-sectional area in which the punch hole contacts a rivet enlarges, whereby the punch hole 201 can stand a larger shear force and stress. Also, since the punch hole is formed to be inclined, a distributed force is applied to the punch hole when a tensile force or a compressive force is applied to the punch hole 201, and thus, the punch hole can endure a larger tensile force and compressive force.

In the present invention, a means for coupling the front 10 and the temples 500 may be configured with a rivet 210. When the rivet 210 is formed in a tapered-pin shape, the rivet 210 is usable even without a rivet fixing pin. In this case, however, a tapered rivet is fixed by pressing in through the punch hole 201. Generally, the means for coupling the front and the temples may be configured with two rivets 210 and a fixing pin 220. The two rivets are inserted through the punch hole 201 and the through hole 502 of each of the temples, and after the fixing pin 220 is inserted into the end of each of the inserted rivets, by applying a pressure to compress the ends of the rivets, the rivets are fixed together with the fixing pin. When the rivet is formed in an oval shape, mounting can be performed with only one rivet. Also, a head of the rivet may be manufactured as one, and the leg of the rivet may be manufactured as two. When the rivet has one head, the head is enlarged, and thus, a trademark may be attached to the head. Also, a rivet loading groove 202 into which a head 211 of the rivet is inserted and loaded and a fixing pin loading groove 203 into which the fixing pin 220 is inserted and loaded may be further formed in the hinge part 200. Since the loading grooves are formed, the temples can be more sturdily mounted through the rivet, and the shaking of the temples 500 can be prevented even when the spectacles are used for a long time.

In the present invention, the fixing pin 220 may have an oval shape, a tetragonal shape, a diamond shape, or an 8-shape in which two rivet through holes 221 are formed. When the fixing pin 220 has an area in which the rivet through hole 221 is formed, the fixing pin 220 may be formed in all shapes. When one rivet having an oval shape is used, one rivet through hole may be formed.

According to another aspect of the present invention, there are provided spectacle frames manufactured using a celluloid plate, including: a front 10 including; left and right eyeball parts 100 in which the lens mounting groove 101 into which a lens is inserted into and mounted on an inner circumferential surface of the lens mounting groove 101 is formed; a connection part 300 that connects the left and right eyeball parts 100; a nose rack 400 that is formed inside the rear surface of each of the eyeball parts 100; and the hinge part 200 that is formed at one side of each eyeball part 100 and connected to temples 500; and the temples 500 that are mounted on the hinge part 200 formed at the front 10, wherein, two punch holes 201 are formed in the hinge part 200, the punch holes 201 pass through the front surface and the rear surface of the hinge part 200 to be inclined at a certain angle, the slot 204 intersecting the punch hole 201 is formed in the side surface portion of the hinge part 200, each the temples includes a ¬-shaped connection part 501, which is configured with a metal plate corresponding to a width of the slot 204, and an ear hanging part 503 that is hinge-coupled to one end of the ¬-shaped connection part 501 to be foldable in an internal direction, a through hole 502 being formed in the other end of the ¬-shaped connection part 501, the ¬-shaped connection part 501 of each of the temples 500 is inserted into the slot 204, and the temples 500 are fixing-mounted on the front 10 by the rivet 210 that is inserted through the punch hole 201 of the hinge part 200 and the through hole 502 of each of the temples 500.

In the hinge part 200 of the present invention, the two punch holes 201 are formed, each of the punch holes 201 may pass through the front surface and the rear surface of the hinge part 200 to be inclined at a certain angle, and the slot 204 intersecting the punch hole 201 may be formed at the side surface portion of the hinge part 200. Forming the punch hole 201 to be inclined at a certain angle serves to prevent the damage of the hinge part even when a large force is applied thereto. Since the punch hole is formed to be inclined, an area in which the punch hole contacts the rivet is enlarged, and thus an allowable stress capable of enduring the weight applied thereto can increase. Accordingly, the sturdiness of the spectacle frames can be ensured. The slot 204 serves to enable the temples to be inserted into the slot 204 and fixed. The slot 204 and the punch hole 201 are alternately formed, and the punch hole 201 is segmented into two pieces by the slot 204. Accordingly, the connection part of each of the temples 500 may be inserted into the slot 204, and the rivet may pass through the punch hole 201 to fix the temples 500. That is, the through hole 502 is formed in the ¬-shaped connection part 501 of each of the temples 500, the ¬-shaped connection part 501 is inserted into the slot 204, and the temples 500 are fixing-mounted on the front 10 by the rivet 210 and the fixing pin 220 that pass through the punch hole 201 of the hinge part 200 and the through hole 502 of each of the temples 500. The fixing pin 220 may be formed in an oval shape, an 8-shape, a tetragonal shape, or a diamond shape. In addition, two rivet through holes 221 may be formed in various shapes. For example, when the rivet is an oval rivet, an oval rivet through hole may be formed in the fixing pin 220. When the temples are fixed by pressing in the rivet in a tapered shape, the temples 500 may be fixing-mounted on the front 10 even without the fixing pin 220. Also, when two rivets are manufactured as one rivet having one head, the head of the rivet is enlarged, and thus, a trademark may be attached to the head. Also, when the rivet is formed in an oval shape and the head is formed in an oval shape, the temples may be coupled to the front using one rivet.

Advantageous Effect

The present invention does not require molds for injection molding and injection molding, and by processing both a hinge part and the front of the spectacle frames, the spectacle frames that can be applied to various wearers' face sizes can be manufactured with only the front of the frames having a single size. Also, by merely changing a design, various designs of the spectacle frames can be realized with only the front of the frames having a single size.

Moreover, according to the present invention, a mold for molding is unnecessary because a previously manufactured plastic plate is used, and thus manufacturing is simple, and the cost is saved.

Moreover, according to the present invention, a punch hole is formed to be inclined at a certain angle in a hinge part formed on the same plane as that of the front of the spectacle frames, and thus the spectacle frames that are sturdily coupled to the temples can be manufactured.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

BEST MODE

Figure 1:
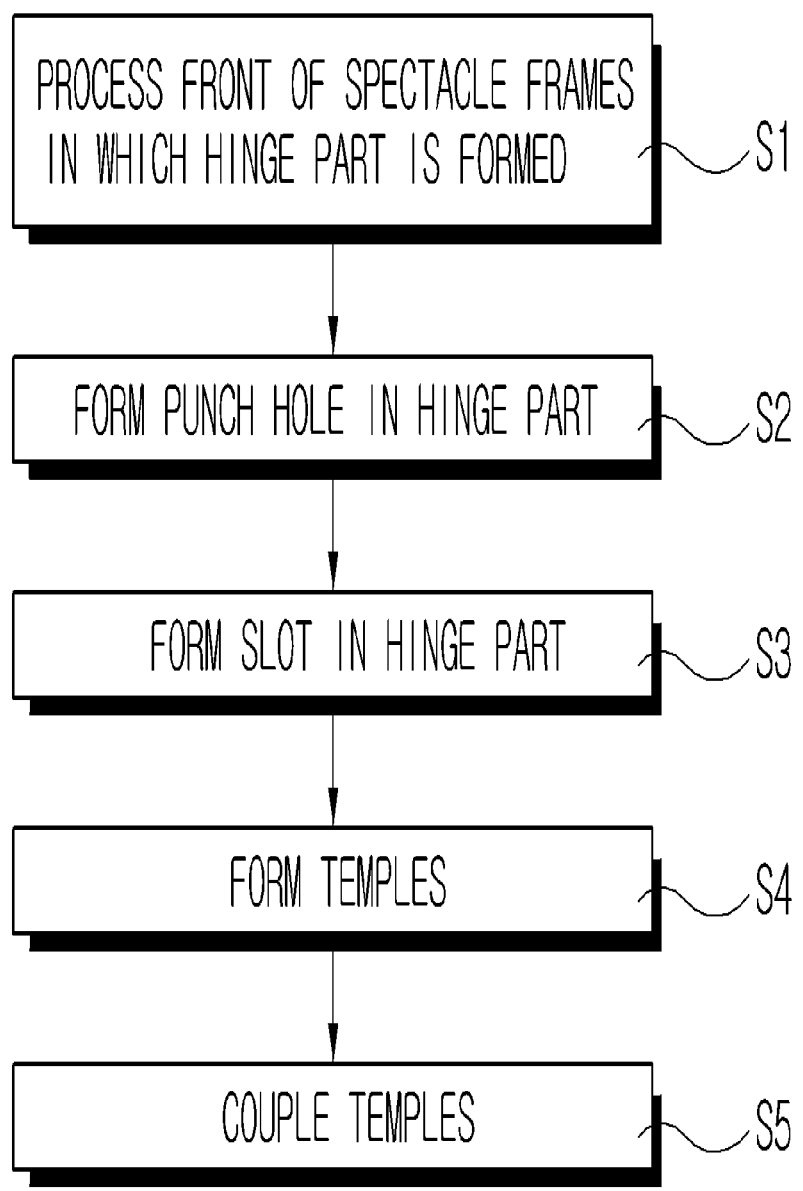
FIG. 1 is a flowchart illustrating a method of manufacturing spectacle frames according to an exemplary embodiment of the present invention.

In the best mode of the present invention, a method of manufacturing spectacle frames using a celluloid plate is provided, the method including: cutting the celluloid plate to process a front 10 of the spectacle frames in which a hinge part 200 is protrusion-formed at a side surface portion of the front 10, and forming a lens mounting groove 101 in an inner circumference surface of an eyeball part 100 of the front 10; forming two punch holes 201 that pass through a front surface and rear surface of the hinge part 200 to be inclined at a certain angle, for connecting temples 500 to the hinge part 200 that is protrusion-formed at a side surface of the processed front 10; forming a slot 204, into which each of the temples 500 is inserted, in a side surface portion of the hinge part 200 with the punch holes 201 formed therein;

forming each temple 500 that includes a ㄱ-shaped connection part 501 that is configured with a metal plate corresponding to a width of the slot 204, and an ear hanging part 503 that is hinge-coupled to one end of the ㄱ-shaped connection part 501 to be foldable in an internal direction, a through hole 502 being formed in the other end of the ㄱ-shaped connection part 501; and inserting the one end of the ㄱ-shaped connection part 501 into the slot 204 formed in the hinge part 200, insertion-fixing a coupling means to the punch hole 201 and the through hole 502, and coupling each temple 500 to the front 10.

MODE FOR THE INVENTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Like reference numerals refer to like elements throughout. Therefore, although like reference numerals or similar reference numerals are not referred or described in a corresponding drawing, they may be described with reference to the other drawing. Also, although reference numeral is not illustrated, it may be described with reference to the other drawings.

Figure 2:
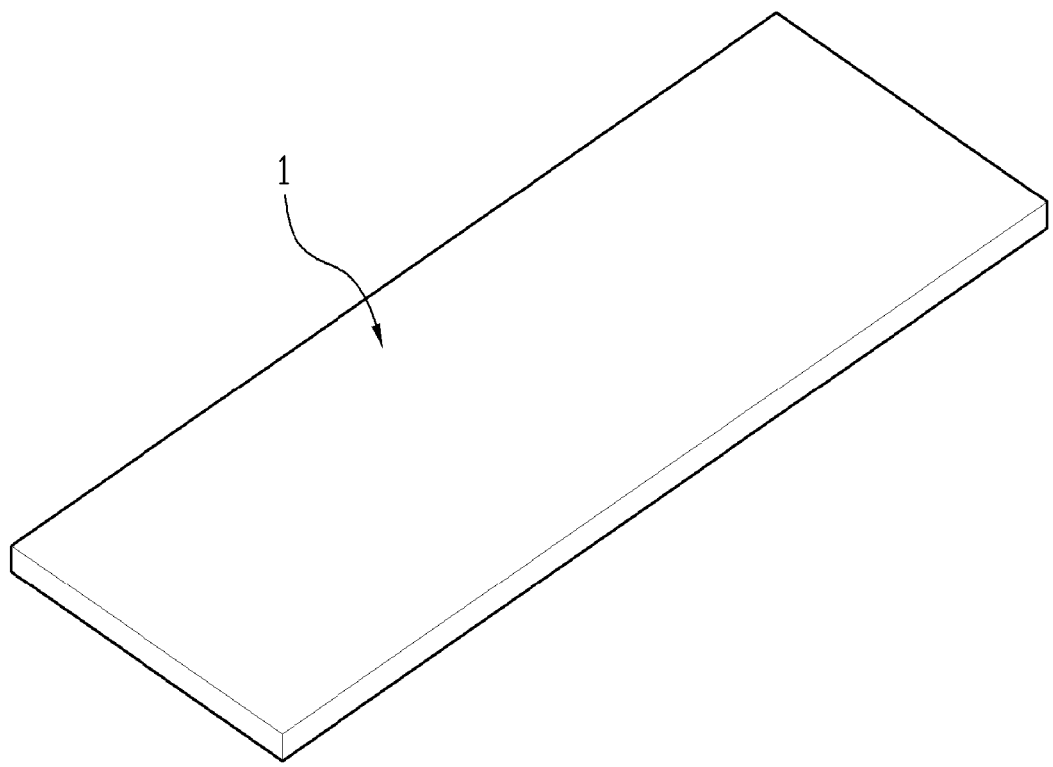
FIG. 2 is a perspective view illustrating a celluloid plate.
Figure 3:
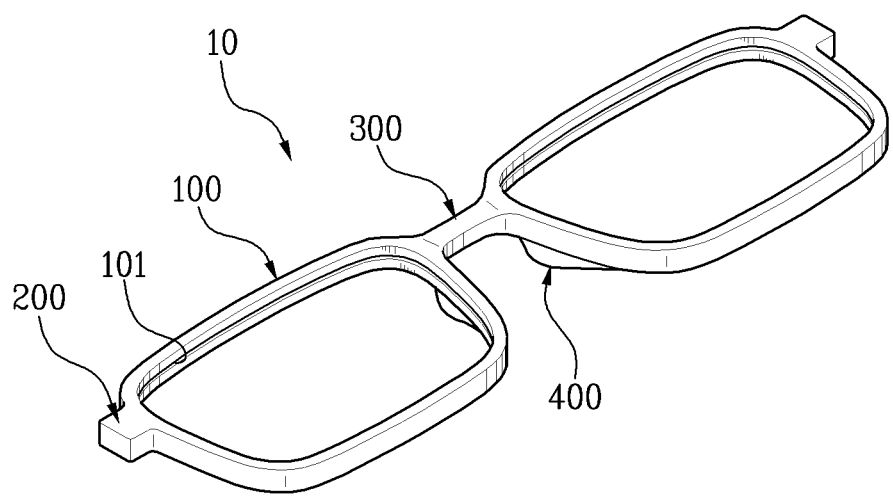
FIG. 3 is a perspective view illustrating the front of the spectacle frames formed according to an exemplary embodiment of the present invention.
Figure 4:
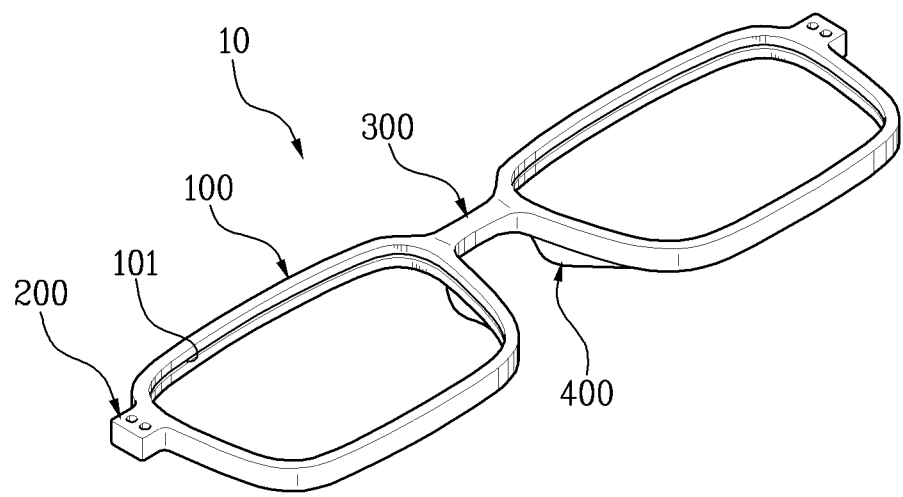
FIG. 4 is a perspective view illustrating a hinge part with a punch hole formed therein.
Figure 5:
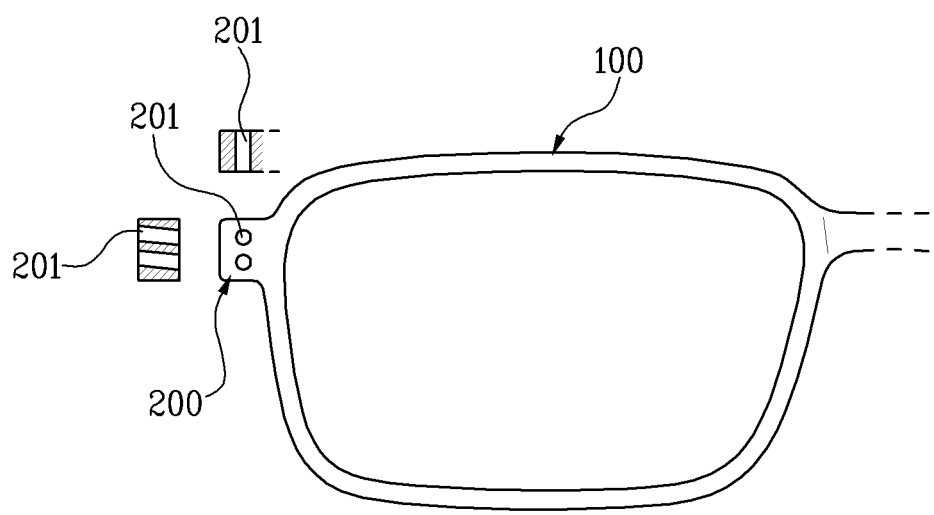
FIG. 5 is a plan view and a cross-sectional view illustrating a first embodiment of a punch hole of a hinge part.
Figure 6:
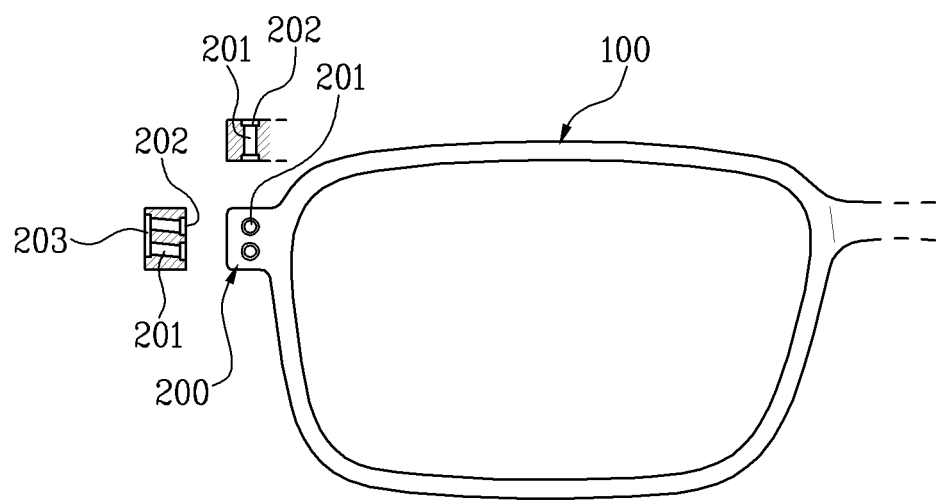
FIG. 6 is a plan view and a cross-sectional view illustrating a second embodiment of the punch hole of the hinge part.
Figure 7:
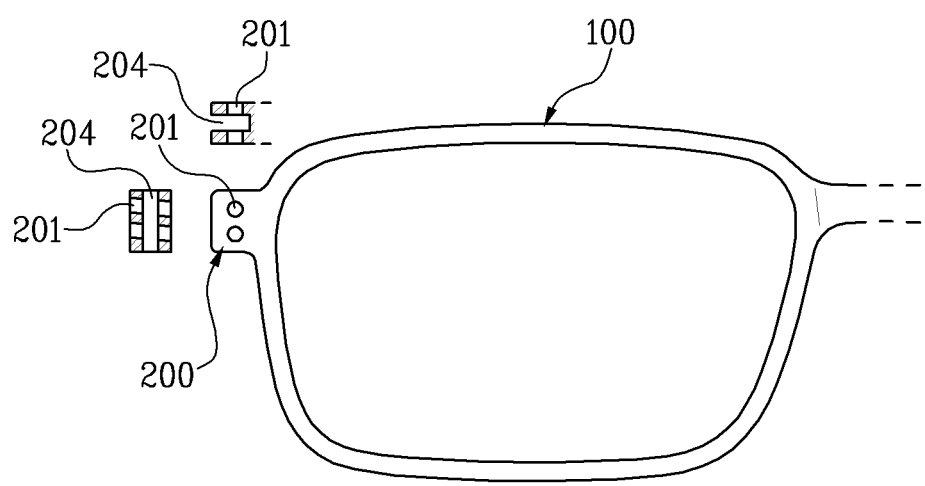
FIG. 7 is a plan view and a cross-sectional view illustrating a first embodiment of a hinge part with a slot formed therein.
Figure 8:
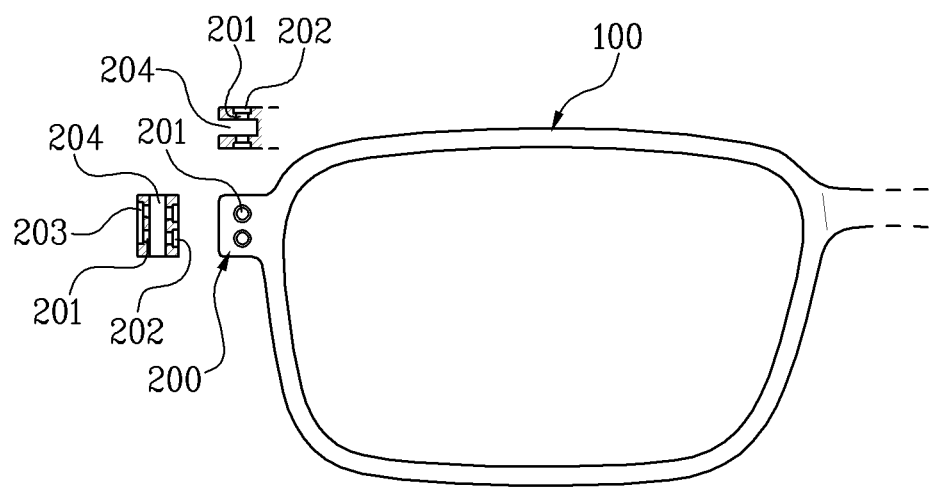
FIG. 8 is a plan view and a cross-sectional view illustrating a second embodiment of the hinge part with the slot formed therein.
Figure 9:
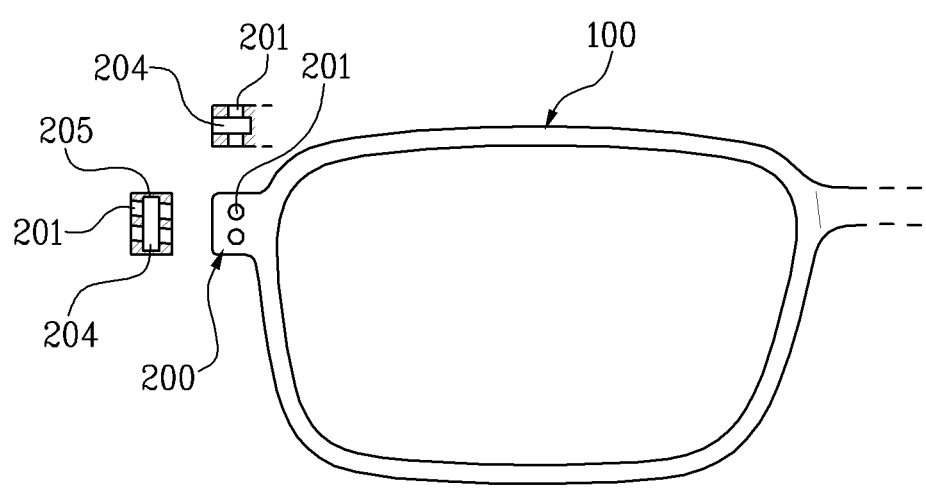
FIG. 9 is a plan view and a cross-sectional view illustrating a third embodiment of the hinge part with the slot formed therein.
Figure 10:
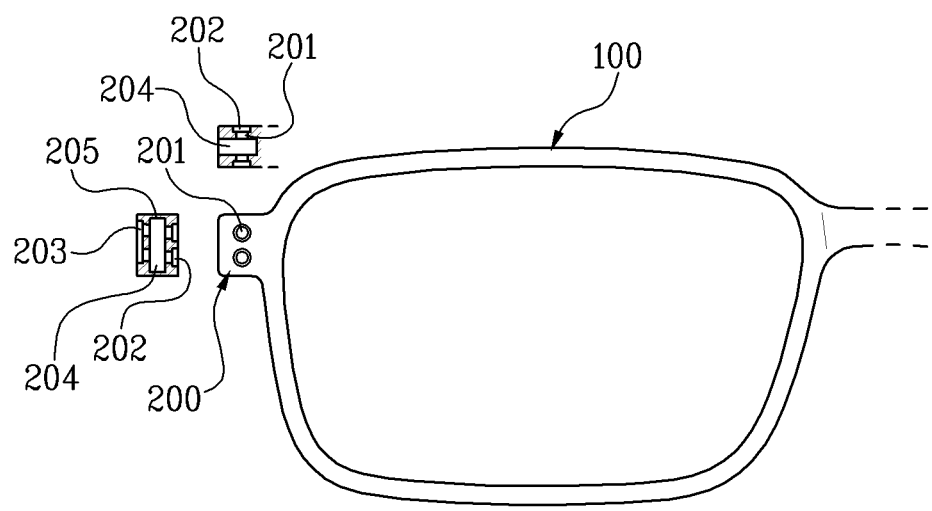
FIG. 10 is a plan view and a cross-sectional view illustrating a fourth embodiment of the hinge part with the slot formed therein.
Figure 11:
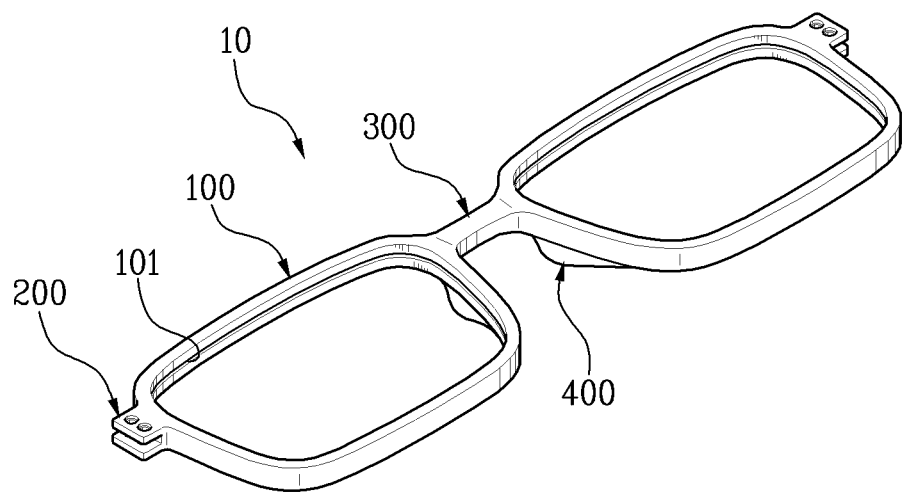
FIG. 11 is a front perspective view illustrating a state in which a hinge part has been finished.
Figure 12:
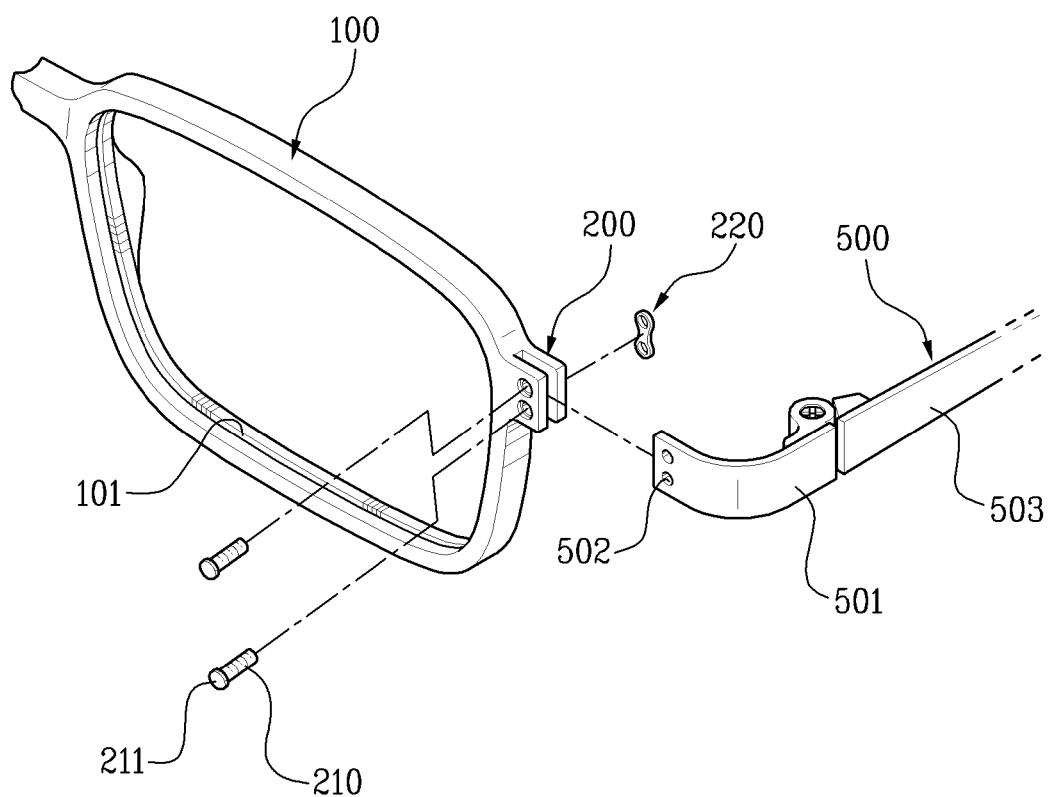
FIG. 12 is a perspective view illustrating a coupling structure between a hinge part and temples.
Figure 13:
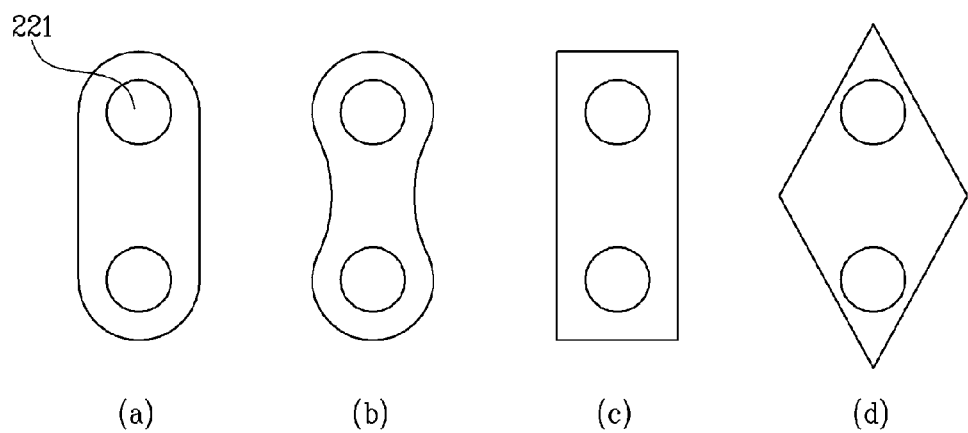
FIG. 13 is a plan view illustrating an exemplary embodiment of a fixing pin.

FIG. 1 is a flowchart illustrating a method of manufacturing spectacle frames according to an exemplary embodiment of the present invention. FIG. 2 is a perspective view illustrating a celluloid plate. FIG. 3 is a perspective view illustrating the front of the spectacle frames formed according to an exemplary embodiment of the present invention. FIG. 4 is a perspective view illustrating a hinge part with a punch hole formed therein. FIG. 5 is a plan view and a cross-sectional view illustrating a first embodiment of a punch hole of a hinge part. FIG. 6 is a plan view and a cross-sectional view illustrating a second embodiment of the punch hole of the hinge part. FIG. 7 is a plan view and a cross-sectional view illustrating a first embodiment of a hinge part with a slot formed therein. FIG. 8 is a plan view and a cross-sectional view illustrating a second embodiment of the hinge part with the slot formed therein. FIG. 9 is a plan view and a cross-sectional view illustrating a third embodiment of the hinge part with the slot formed therein. FIG. 10 is a plan view and a cross-sectional view illustrating a fourth embodiment of the hinge part with the slot formed therein. FIG. 11 is a front perspective view illustrating a state in which a hinge part has been finished. FIG. 12 is a perspective view illustrating a coupling structure between a hinge part and temples. FIG. 13 is a plan view illustrating an exemplary embodiment of a fixing pin.

A method of manufacturing spectacle frames according to an exemplary embodiment of the present invention will now be described with reference to FIG. 1. The method of manufacturing spectacle frames according to an exemplary embodiment of the present invention includes: operation S1 of cutting a celluloid plate to process a front 10 of the spectacle frames in which a hinge part 200 is protrusion-formed at a side surface portion of the front 10, and forming a lens mounting groove 101 in an inner circumference surface of an eyeball part 100 of the front 10; operation S2 of forming two punch holes 201 which pass through a front surface and rear surface of the hinge part 200 to be inclined at a certain angle, for connecting temples 500 to the hinge part 200 that is protrusion-formed at a side surface of the processed front 10; operation S3 of forming a slot 204, into which each of the temples 500 is inserted, in a side surface portion of the hinge part 200 with the punch holes 201 formed therein; operation S4 of forming each temple 500 that includes a ㄱ-shaped connection part 501 configured with a metal plate corresponding to the width of the slot 204, in which a through hole 502 is formed in one end of the ㄱ-shaped connection part 501, and an ear hanging part 503 that is hinge-coupled to the other end of the ㄱ-shaped connection part 501 to be foldable in an internal direction; and operation S5 of inserting the one end of the ㄱ-shaped connection part 501 into the slot 204 formed in the hinge part 200, insertion-fixing a coupling means to the punch hole 201 and the through hole 502, and coupling each temple 500 to the front 10.

The method of manufacturing spectacle frames according to an exemplary embodiment of the present invention will now be described with reference to FIGS. 2 to 13. In the method of manufacturing spectacle frames according to an exemplary embodiment of the present invention, as illustrated in FIGS. 2 and 3, the front 10 of the spectacle frames is first formed by cut-processing a celluloid plate 1. The celluloid plate 1 is formed through a cutting process, in which a plate is processed using a machining center (MC) process. The front 10 of the spectacle frames having a desired design is carved in the celluloid pate 1 using a computer, and the front 10 is formed by performing the MC process according to the carved design. FIG. 3 illustrates the front 10 of the spectacle frames that has been processed by the cutting process. The front 10 includes an eyeball part 100, a connection part 300 for connection of the eyeball part 100, the hinge part 200 that is formed at an outer side of the eyeball part 100, and a nose rack 400 that is formed inside the front 10 and fixes the spectacle frames to a nose region of a wearer.

FIGS. 4 to 6 are views illustrating an operation of forming the punch hole in the hinge part 200. FIG. 4 is a perspective view illustrating a state in which the punch hole has been formed in the hinge part 200. FIGS. 5 and 6 are views illustrating an exemplary embodiment of the punch hole 201. In FIG. 5, the punch hole 201 is formed to be inclined at a certain angle through the front surface and the rear surface of the hinge part 200. Forming the punch hole 201 to be inclined at a certain angle overcomes a limitation in which the hinge part 200 is easily broken by the large weight applied to the temples 500. Since the punch hole 201 is formed to be inclined at a certain angle, when a shear force, a tensile force, or a compressive force is applied to the spectacle frames, a cross-sectional area is enlarged, and thus an allowable stress increases. Accordingly, the easy breakage of the hinge part 200 is prevented, and the durability of the spectacle frames is enhanced. FIG. 6 is a view illustrating a state in which a rivet loading groove 202 has been formed in the front surface of the hinge part 200, and a fixing pin loading groove 203 has been formed in the rear surface of the hinge part 200. The protrusion of a head of a rivet or a fixing pin can be prevented by forming the rivet loading groove 202 and the fixing pin loading groove 203. Also, neither the rivet nor the fixing pin protrudes, thus forming a refined design.

FIGS. 7 to 10 are views illustrating an operation of forming the slot 204 in the side surface of the hinge part 200. FIG. 7 is a perspective view illustrating an operation of forming the slot 204 when the rivet loading groove 202 and the fixing pin loading groove 203 have not been formed. As seen in the drawings, the slot 204 and the punch hole 201 are alternately formed, and the punch hole 201 is segmented into two pieces by the slot 204. FIG. 8 is a perspective view illustrating an operation of forming the slot 204 when the rivet loading groove 202 and the fixing pin loading groove 203 have been formed. In the drawing, the rivet loading groove 202 and the fixing pin loading groove 203 are formed, and thus neither the rivet nor the fixing pin protrudes when the temples are fixed and mounted by the rivet. FIGS. 9 and 10 illustrate embodiments of a state in which the slot 204 is not formed in an entirely upward and downward length, and a wall is formed in each of an upper portion and lower portion of the slot 204. As illustrated in FIG. 9, a slot wall 205 is formed at each of the upper portion and lower portion of the slot 204. Due to the slot wall 205, the temples 500 inserted into the slot 204 can be more sturdily fixed, and the shaking of the temples 500 can be prevented even when the spectacles are used for a long time. FIG. 10 is a view illustrating an operation of forming the slot 204 when the rivet loading groove 202 and the fixing pin loading groove 203 have been formed. In FIG. 10, similarly to FIG. 9, the slot wall 205 is formed.

FIG. 11 is a view illustrating the finished front 10. In the drawing, the punch hole 201 and the slot 204 are formed in the hinge part 200.

FIG. 12 is a perspective view illustrating an operation of coupling the temples 500 to the front 10. In the drawing, a rivet through hole 501 is formed in one end of the ㄱ-shaped connection part 501 of each of the temples 500, and the one end of the ㄱ-shaped connection part 501 is inserted into the slot 204, in which case a rivet 201 is inserted through the punch hole 201 and the other end of the rivet 210 is inserted into the fixing pin 220. In a state in which the rivet 201 has been inserted into the fixing pin 220, a head is formed by applying compression in order for the fixing pin 220 not to fall out, and thus an end portion of the rivet 201 that protrudes through the rivet through hole 221 of the fixing pin 220 is fixed together with the fixing pin 220. Accordingly, the spectacle frames having various sizes can be formed according to the length of the ㄱ-shaped connection part 501. That is, by enlarging the length of a side in which the through hole 502 of the ㄱ-shaped connection part 501 is formed, the spectacle frames having various sizes can be formed even when the constant length of the front 10 is formed. Although not shown, two rivets 210 may be configured with one head and two legs. Also, when the rivet 210 is formed in an oval shape, the temples 500 may be mounted on the front 10 using only one rivet. Also, when the rivet 210 is formed in a tapered shape and fixed by pressing in through the punch hole 201, the temples 500 may be fixing-mounted on the front 10 even without the fixing pin 220.

FIG. 13 is a view illustrating a plurality of the fixing pins 220 having various shapes. In the drawing, the fixing pins 220 may be respectively formed in an oval shape, an 8-shape, a tetragonal shape, and a diamond shape. In addition, it is obvious to those skilled in the art that the fixing pin 220 may be formed in various shapes. The fixing pin 220 is not formed as two but as one, and thus the temples 500 can be more sturdily fixed, and the shaking of the temples 500 can be prevented even when the spectacles are used for a long time.

The spectacle frames according to an exemplary embodiment of the present invention, as illustrated in FIG. 12, include the front 10 that includes: left and right eyeball parts 100 in which the lens mounting groove 101 into which a lens is inserted and mounted on an inner circumference surface of the lens mounting groove 101 is formed; a connection part 300 that connects the left and right eyeball parts 100; a nose rack 400 that is formed inside the rear surface of each of the eyeball parts 100; and the hinge part 200 that is formed at one side of each eyeball part 100 and connected to the temples 500, and the temples 500 that are mounted on the hinge part 200 formed at the front 10. The two punch holes 201 are formed in the hinge part 200, the punch holes 201 pass through the front surface and the rear surface of the hinge part 200 to be inclined at a certain angle, and the slot 204 intersecting the punch hole 201 is formed in the side surface portion of the hinge part 200. The through hole 502 is formed in the ㄱ-shaped connection part 501 of each of the temples 500, the ㄱ-shaped connection part 501 is inserted into the slot 204, and the temples 500 are fixing-mounted on the front 10 by the rivet 210 and the fixing pin 220 that pass through the punch hole 201 of the hinge part 200 and the through hole 502 of each of the temples 500. As described above, the fixing pin 220 may be formed in an oval shape, an 8-shape, a tetragonal shape, or a diamond shape. The effects of the inclined punch hole 201 are as described above. In this way, the spectacle frames according to an exemplary embodiment of the present invention are manufactured using the celluloid plate, and thus a separate mold is not required. The durability and sturdiness of the spectacle frames are enhanced by forming the inclined punch hole 201, and by using the celluloid plate, the spectacle frames that are light and have durability can be manufactured. Also, the front 10 is formed of plastic, and the temples 500 are formed to have a metal frame, thus realizing the spectacle frames having various colors and designs.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

INDUSTRIAL APPLICABILITY

The present invention relates to spectacle frames using a celluloid plate and a manufacturing method thereof, in which a front of the spectacle frames is formed by processing a celluloid plate of plastic, and temples are mounted on the front of the spectacle frames, thereby manufacturing the spectacle frames using the celluloid plate. Accordingly, the present invention enables the manufacturing of the spectacle frames having various shapes and thus has high industrial applicability.

What is claimed is:

1. A method of manufacturing spectacle frames using a celluloid plate, the method comprising:

cutting the celluloid plate to process a front of the spectacle frames in which a hinge part is protrusion-formed at a side surface portion of the front, and forming a lens mounting groove in an inner circumference surface of an eyeball part of the front; forming two punch holes that pass through a front surface and rear surface of the hinge part to be inclined at a certain angle, for connecting temples to the hinge part that is protrusion-formed at a side surface of the front;

forming a slot in a vertical direction orthogonal to an insertion direction of rivets, into which each of the temples is inserted, in a side surface portion of the hinge part with the punch holes formed therein;

forming each temple that comprises a curved shaped connection part that is configured with a metal plate corresponding to a width of the slot, and an ear hanging part that is hinge-coupled to one end of the curved shaped connection part to be foldable in an internal direction, a through hole being formed in the other end of the curved shaped connection part; and inserting the one end of the curved shaped connection part into the slot 204 formed in the hinge part, insertion-fixing a coupling means to the punch hole and the through hole, and coupling each temple to the front.

2. The method of claim 1, wherein the coupling means is configured with a rivet.

3. The method of claim 2, further comprising forming a fixing pin configured to fix the rivet, the fixing pin having an oval shape, a tetragonal shape, a diamond shape, or an 8-shape in which two rivet through holes are formed.

4. The method of claim 3, further comprising:

forming a rivet loading groove into which a head of the rivet is inserted and loaded in the hinge part; and forming a fixing pin loading groove into which the fixing pin is inserted and loaded in the hinge part.

5. Spectacle frames manufactured using a celluloid plate, the frames comprising:

a front comprising left and right eyeball parts in which the lens mounting groove into which a lens is inserted and mounted on an inner circumference surface thereof is formed, a connection part that connects the left and right eyeball parts, a nose rack that is formed inside the rear surface of each of the eyeball parts, and the hinge part that is formed at one side of each eyeball part and connected to temples; and the temples that are mounted on the hinge part formed at the front, wherein, two punch holes are formed in the hinge part, the punch holes pass through the front surface and the rear surface of the hinge part to be inclined at a certain angle, and a slot intersecting the punch hole is formed in the side surface portion of the hinge part, the slot formed a vertical direction orthogonal to an insertion direction of rivets, each of the temples comprises a curved shaped connection part, which is configured with a metal plate corresponding to a width of the slot, and an ear hanging part that is hinge-coupled to one end of the curved shaped connection part to be foldable in an internal direction, a through hole being formed in the other end of the curved shaped connection part, and the curved shaped connection part of each of the temples is inserted into the slot, and the temples are fixing-mounted on the front by the rivet that is inserted through the punch hole of the hinge part and the through hole of each of the temples.

6. The frames of claim 5, further comprising forming a fixing pin configured to fix the rivet, the fixing pin having an oval shape, a tetragonal shape, a diamond shape, or an 8-shape in which two rivet through holes are formed.

* * * * *